United States Patent
Chelba et al.

(10) Patent No.: US 7,406,416 B2
(45) Date of Patent: Jul. 29, 2008

(54) REPRESENTATION OF A DELETED INTERPOLATION N-GRAM LANGUAGE MODEL IN ARPA STANDARD FORMAT

(75) Inventors: Ciprian Chelba, Seattle, WA (US); Milind Mahajan, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 850 days.

(21) Appl. No.: 10/810,254

(22) Filed: Mar. 26, 2004

(65) Prior Publication Data

US 2005/0216265 A1 Sep. 29, 2005

(51) Int. Cl.
G06F 17/27 (2006.01)
G10L 15/00 (2006.01)
G10L 15/28 (2006.01)

(52) U.S. Cl. .................... 704/240; 704/9; 704/243; 704/255

(58) Field of Classification Search ........... 704/240
See application file for complete search history.

(56) References Cited

U.S. PATENT DOCUMENTS

| | | | | |
|---|---|---|---|---|
| 5,258,909 A | * | 11/1993 | Damerau et al. | 715/533 |
| 5,267,345 A | * | 11/1993 | Brown et al. | 704/255 |
| 5,444,617 A | * | 8/1995 | Merialdo | 704/9 |
| 5,467,425 A | * | 11/1995 | Lau et al. | 704/243 |
| 6,188,976 B1 | | 2/2001 | Ramaswamy et al. | 704/9 |

FOREIGN PATENT DOCUMENTS

EP 0 805 434 A2 11/1997

OTHER PUBLICATIONS

Dempster, A.P., et al., "Maximum Likelihood from Incomplete Data Via the EM Agorithm," Journal of the Royal Statistical Society, vol. 39 of B, pp. 1-38, 1977.

Jelinek, F., et al., "Interpolated Estimation of Markov Source Parameters from Sparse Data," E. Gelsema and L. Kanal, editors, Pattern Recognition in Practice, pp. 381-397, 1980.

Paul, D.B., et al, "The Design for the Wall Street Journal-Based CSR Corpus," Proceedings of the DARPA SLS Workshop, Feb. 1992.

Seymore, K., et al., "Scalable Back-Off Language Models," Proceedings ICSLP, vol. 1, pp. 232-235, Philadelphia, 1996.

Stolcke, A., "Entropy-Based Pruning of Back-Office Language Models," Proceedings of News Transcription and Understanding Workshop, pp. 270-274, Lansdowne, VA 1998, DARPA.

S. Katz, "Estimation of Probabilities From Sparse Data for the Language Model Component of a Speech Recognizer." In *IEEE Transactions on Acoustics, Speech and Signal Processing*, vol. 35, pp. 400-401, Mar. 1987.

(Continued)

*Primary Examiner*—David R. Hudspeth
*Assistant Examiner*—Justin W Rider
(74) *Attorney, Agent, or Firm*—Theodore M. Magee; Westman, Champlin & Kelly, P.A.

(57) ABSTRACT

A method and apparatus are provided for storing parameters of a deleted interpolation language model as parameters of a backoff language model. In particular, the parameters of the deleted interpolation language model are stored in the standard ARPA format. Under one embodiment, the deleted interpolation language model parameters are formed using fractional counts.

20 Claims, 7 Drawing Sheets

OTHER PUBLICATIONS

Office Action from the Chinese Patent Office in foreign application No. 200510060153.6 Mar. 25, 2005.

C. Crespo, D. Tapias, G. Escalada, and J. Alvarez, 1997, "Language Model Adaptation for Conversational Speech Recognition Using Automatically Tagged Pseudo-Morphological Classes," In Proceedings of the IEEE International Conference on Acoustics, Speech, and Signal Processing, vol. 2, pp. 823-826.

Renato DeMori and Marcello Federico, 1999, "Language Model Adaptation," In K. Ponting, editor, Computational Models of Speech Pattern Processing, pp. 280-303, Springer Verlag, Berlin, New York.

Frederick Jelinek and Robert Mercer, 1980, "Interpolated Estimation of Markov Source Parameters from Sparse Data," In E. Gelsema and L. Kanal, editors, Pattern Recognition In Practice, pp. 387-397.

F. Jelinek, B. Merialdo, S. Roukos, and M. Strauss, 1991, "A Dynamic Language Model for Speech Recognition," In Proceedings of Speech and Natural Language DARPA Workshop, pp. 293-295.

S. Mori, M. Nishimura, and N. Itoh, 2003, "Language Model Adaptation Using Word Clustering," In Proceedings of the European Conference on Speech Communication and Technology, pp. 425-428.

H. Erdongan, "Semantic Structural Language Models," ICSLP 2002 Proceedings.

Cyril Allauzen, Mehryar Mohri, and Brian Roard, 2003, "Generalized Algorithms for Constructing Language Models," To appear in Proceedings of the 41$^{st}$ Annual Meeting of the Association for Computational Linguistics (ACL).

J. Zhang et al., "Improvements in Audio Processing and Language Modeling in the CU Communicator," Eurospeech 2001.

European Search Report from Application No. 05102283.8, filed Mar. 22, 2005.

Huang et al., "Deleted Interpolation And Density Sharing for Continuous Hidden Markov Models," 1996 IEEE International Conference On Acoustics, Speech and Signal Processing, Atlanta, May 7-10, 1996.

Wu et al., "Improved Katz Smoothing for Language Modeling in Speech Recognition," ICSLP 2002: 7$^{th}$ International Conference on Spoken Language Processing, Denver, Colorado, Sep. 16-20, 2002.

Chelba, et al., "Speech Utterance Classification," 2003 IEEE International Conference on Acoustics, Speech and Signal Processing, Hong Kong, Apr. 6-10, 2003.

Bacchiani et al., "MAP Adaptation of Stochastic Grammars," Computer Speech and Language, Elsevier, London, Jan. 11, 2005.

Chinese First Office Action from Application No. 200510060153.6, filed Mar. 22, 2005.

* cited by examiner

REPRESENTATION OF A DELETED INTERPOLATION N-GRAM LANGUAGE MODEL IN ARPA STANDARD FORMAT

BACKGROUND OF THE INVENTION

The present invention relates to language models. In particular, the present invention relates to storage formats for storing language models.

Language models provide probabilities for sequences of words. Such models are trained from a set of training data by counting the frequencies of sequences of words in the training data. One problem with training language models in this way is that sequences of words that are not observed in the training data will have zero probability in the language model, even though they may occur in the language.

To overcome this, back-off modeling techniques have been developed. Under a back-off technique, if a sequence of n words is not found in the training data, the probability for the sequence of words is estimated using a probability for a sequence of n−1 words and a back-off weight. For example, if a trigram $(w_{n-2}\ w_{n-1}\ w_n)$ is not observed in the training data, its probability is estimated using the probability of the bigram $(w_{n-1}\ w_n)$ and a back-off weight associated with the context $(w_{n-2}\ w_{n-1})$.

N-gram language models that use back-off techniques are typically stored in a standard format referred to as the ARPA standard format. Because of the popularity of back-off language models, the ARPA format has become a recognized standard for transmitting language models. However, not all language models have back-off weights. In particular, deleted interpolation N-gram models do not have back-off weights because they use a different technique for handling the data sparseness problem associated with language models. As a result, deleted interpolation language models have not been stored in the standard ARPA format. Because of this, it has not been easy to integrate deleted interpolation language models into language systems that expect to receive the language model in the ARPA format.

SUMMARY OF THE INVENTION

A method and apparatus are provided for storing parameters of a deleted interpolation language model as parameters of a backoff language model. In particular, the parameters of the deleted interpolation language model are stored in the standard ARPA format. Under one embodiment, the deleted interpolation language model parameters are formed using fractional counts.

DETAILED DESCRIPTION OF ILLUSTRATIVE EMBODIMENTS

Figure 1:
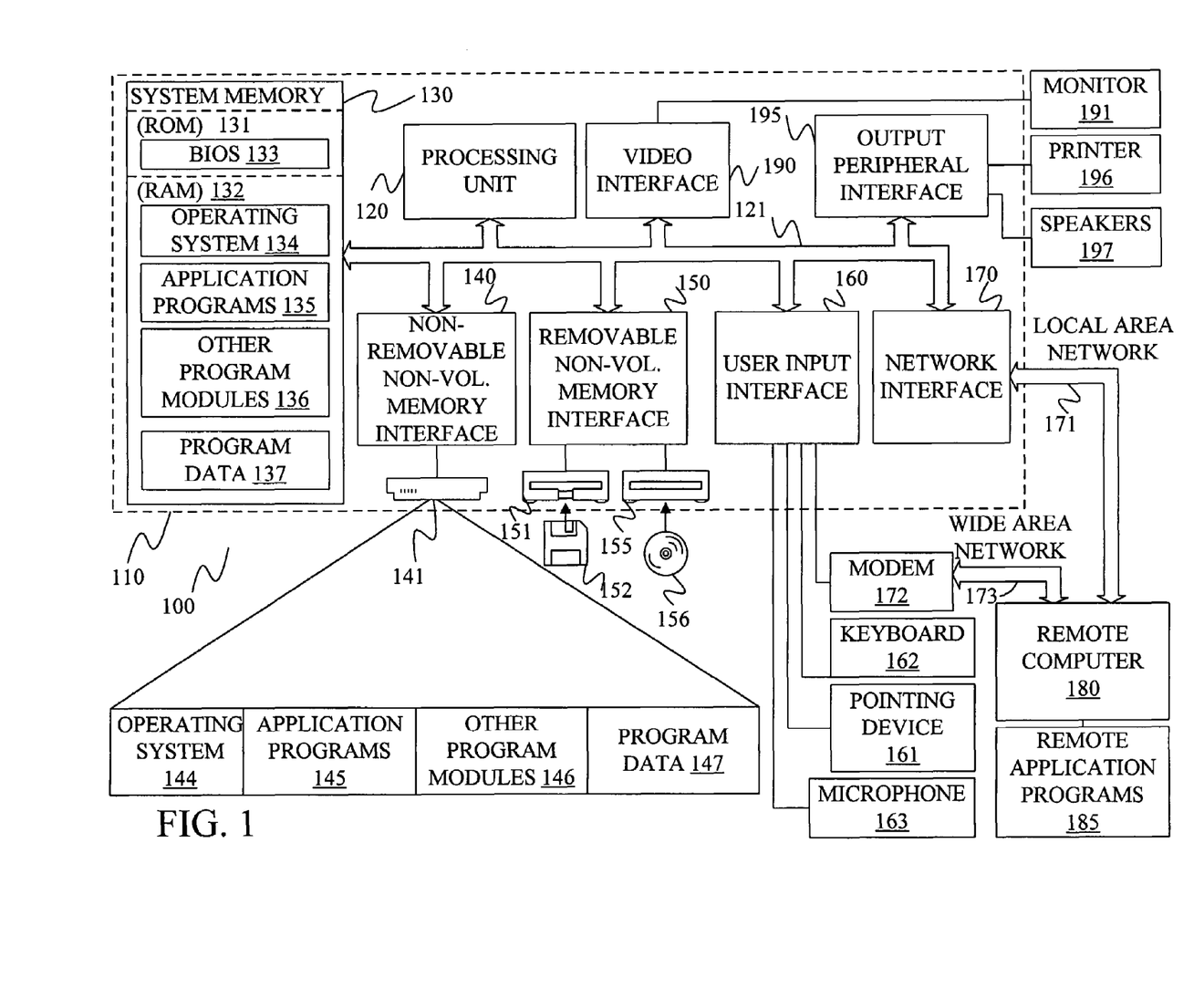
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention provides a technique for storing a language model generated through deleted interpolation in the standard ARPA format. In deleted interpolation, an N-gram probability is determined as a linear interpolation of a relative frequency estimate for the N-gram probability and a probability for a lower order n-gram. The probability of the lower order n-gram is similarly defined as an interpolation between the relative frequency probability estimate for the lower order n-gram and next lower order n-gram. This continues until a unigram probability is determined. Thus, the interpolation is determined recursively according to:

$$P(v_k|v_{k-(n-1)} \ldots v_{k-1}) = (1-\lambda_{n-1}(v_{k-(n-1)} \ldots v_{k-1}))f(v_k|v_{k-(n-1)} \ldots v_{k-1}) + \lambda_{n-1}(v_{k-(n-1)} \ldots v_{k-1})P(v_k|v_{k-(n-2)} \ldots v_{k-1})$$ EQ. 1 where $P(v_k|v_{k-(n-1)} \ldots v_{k-1})$ is the probability of the n-gram, $\lambda_{n-1}(v_{k-(n-1)} \ldots v_{k-1})$ is an interpolation weight that is a function of the context $v_{k-(n-1)} \ldots v_{k-1}$ of the N-gram, $f(v_k|v_{k-(n-1)} \ldots v_{k-1})$ is the relative frequency of the N-gram, which is the number of times the N-gram appears in the training text over the number of times the context of the N-gram appears in the training text, and $P(v_k|v_{k-(n-2)} \ldots v_{k-1})$ is the probability of the next lower order n-gram, which is determined recursively using equation 1 with a weight $\lambda_{n-2}(v_{k-(n-2)} \ldots v_{k-1})$ that is a function of the context of the lower order n-gram. The recursion of Equation 1 ends with a unigram probability that is determined as:

$$P(v_k) = (1-\lambda_0)f(v_k) + \lambda_0 \frac{1}{|V|}$$ EQ. 2 where $P(v_k)$ is the unigram probability, $\lambda_0$ is the unigram interpolation weight, $f(v_k)$ is the relative frequency for the unigram $v_k$, which is the ratio of the number of times the unigram appears in the training text over the number of words in the training text, and $|V|$ is the number of words in the vocabulary, which acts as a default unigram probability.

Using the recursion of Equations 1 and 2, the probability for the N-gram becomes an interpolation of relative frequencies for different orders of n-grams that are below the N-gram of interest. For example, for a trigram, the recursive interpolation produces:

$$P(v_k \mid v_{k-2}v_{k-1}) = (1 - \lambda_2(v_{k-2}v_{k-1}))f(v_k \mid v_{k-2}v_{k-1}) + \qquad \text{EQ. 3}$$
$$\lambda_2(v_{k-2}v_{k-1})(1 - \lambda_1(v_{k-1}))f(v_k \mid v_{k-1}) +$$
$$\lambda_2(v_{k-2}v_{k-1})\lambda_1(v_{k-1})(1-\lambda_0)f(v_k) + \lambda_2(v_{k-2}v_{k-1})\lambda_1(v_{k-1})\lambda_0 \frac{1}{|V|}$$

Where $P(v_k|v_{k-2}v_{k-1})$ is the trigram probability, $f(v_k|v_{k-2}v_{k-1})$ is the relative frequency of the trigram in a training text, $f(v_k|v_{k-1})$ is the relative frequency of a bigram in the training text, $f(v_k)$ is the relative frequency of the unigram in the training text, $|V|$ is the number of vocabulary words in the language model, and $\lambda_2, \lambda_1, \lambda_0$ are the context-dependent interpolation weights.

Under some embodiments, the counts used to determine the relative frequencies are not limited to integer valued counts and may include fractional values that are computed as the expected values of the counts. This is one advantage of deleted interpolation over other back-off methods, such as the Katz back-off method, which cannot be used on fractional (real valued) counts.

Figure 2:
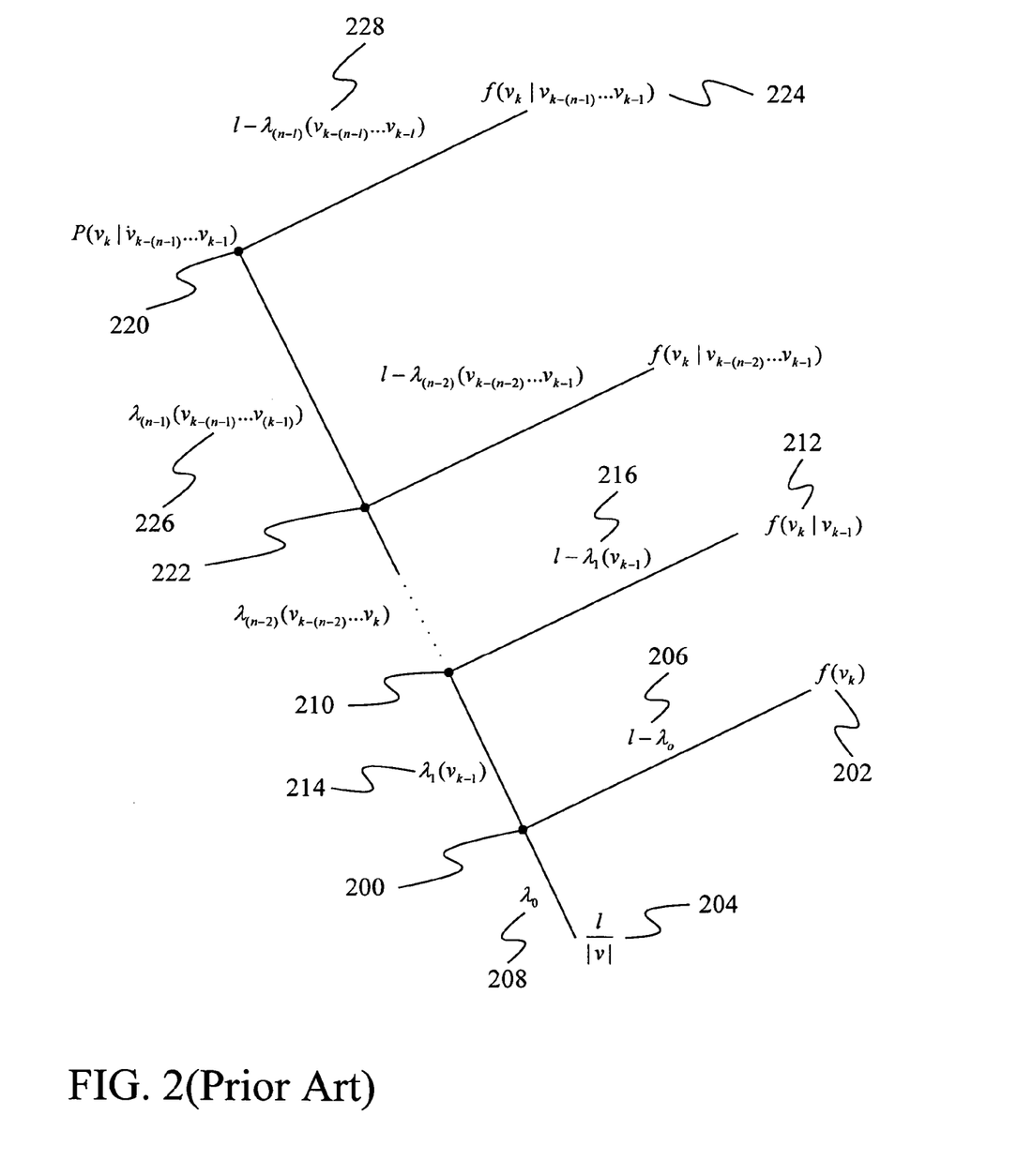
FIG. 2 is a graph of a deleted interpolation n-gram language model under the prior art.

FIG. 2 provides a graphical representation of the calculation of the N-gram probability using deleted interpolation. In FIG. 2, the intersection points between the lines represent the interpolation of a probability for an n-gram. For example, the unigram probability is determined at node 200 and the N-gram probability is determined at node 220. At each node, a weighted relative frequency is added to the weighted probability determined at a lower node.

For example, beginning at node 200, the interpolated unigram probability is determined as the weighted sum of the unigram relative frequency 202 and the default unigram probability 204 where weight 206 $(1-\lambda_0)$ is applied to relative frequency 202 and weight 208 $(\lambda_0)$ is applied to the default unigram probability 204.

The probability at the next higher node 210 is the weighted sum of the relative frequency 212 for the bigram and the unigram probability of node 204. A weight 214 $(\lambda_1(v_{k-1}))$, which is a function of the context of the bigram, is applied to the unigram probability of node 204 while a weight 216 $(1-\lambda_1(v_{k-1}))$ is applied to the relative frequency 212.

This recursive summation continues upward until it reaches node 220 for the N-gram probability. The probability determined for node 220 is the weighted sum of the probability determined at node 222 for the next lower order n-gram and the relative frequency 224 of the N-gram, where the weight 226 applied to the lower order probability is $\lambda_{(n-1)}(v_{k-(n-1)} \ldots v_{k-1})$ and the weight 228 applied to the relative frequency is $1-\lambda_{(n-1)}(v_{k-(n-1)} \ldots v_{k-1})$, which are both dependent on the context of the N-gram.

Figure 3:
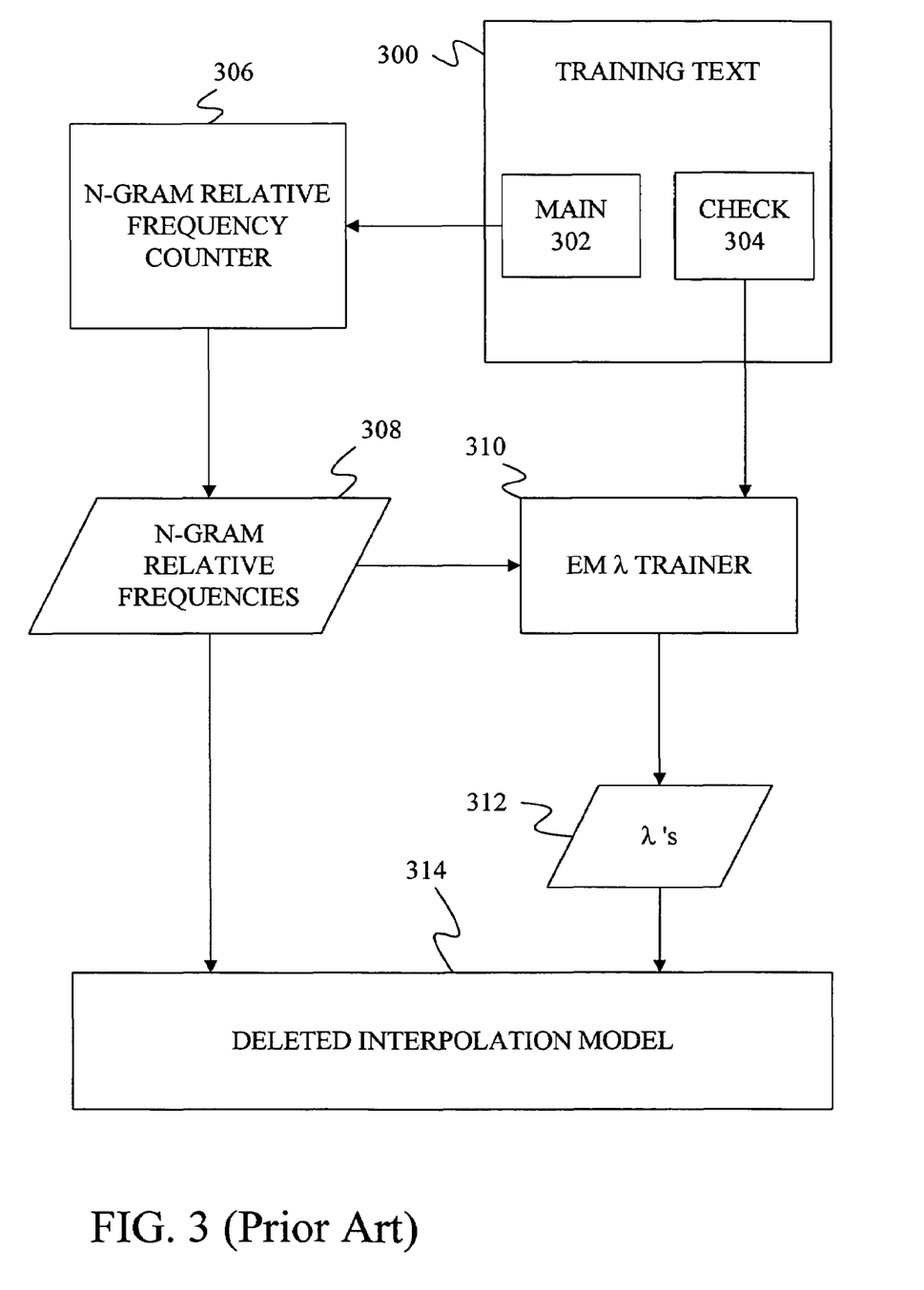
FIG. 3 is a block diagram of a training system for training a deleted interpolation n-gram language model under the prior art.
Figure 4:
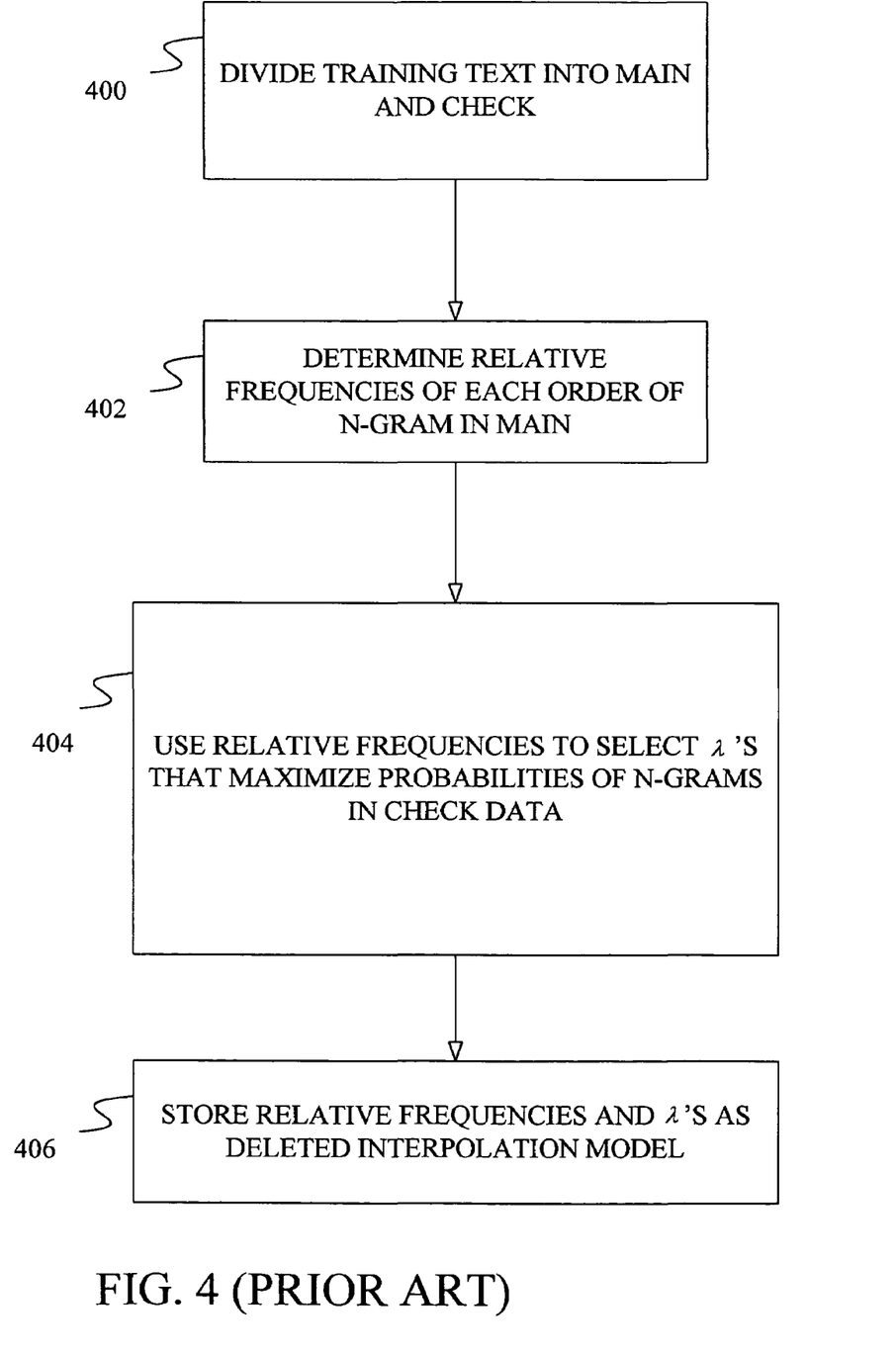
FIG. 4 is a flow diagram for training a deleted interpolation n-gram under the prior art.

As can be seen from FIG. 2, in order to determine the probabilities for an N-gram, the relative frequencies for the lower order n-grams and the weights for the contexts must be determined. FIGS. 3 and 4 provide a block diagram and a flow diagram for determining these values.

In step 400 of FIG. 4 a training text 300 is divided into a main portion 302 and a check portion 304. At step 402, a relative frequency counter 306 parses main portion 302 into n-grams of varying orders from unigrams to the highest N-gram of interest. Relative frequency counter 306 then counts the relative frequency of each n-gram in each order of n-gram. This produces a set of n-gram relative frequency counts 308 for each n-gram in each order of n-gram.

At step 404, the relative frequencies 308 are applied to an EM trainer 310, which uses an expectation maximization algorithm to set the values for the weights, $\lambda_{n-1} \ldots \lambda_0$, so as to maximize the total probability of all of the highest order N-grams such that:

$$[\lambda_{n-1} \ldots \lambda_0] = \qquad \text{EQ. 4}$$
$$\operatorname{argmax}_{\lambda_{n-1} \ldots \lambda_0} \prod_i P(v_k \mid v_{k-(n-1)} \ldots v_{k-1}, \lambda_{n-1} \ldots \lambda_0)_i$$

Where $[\lambda_{n-1} \ldots \lambda_0]$ is the set of weights that maximize the probabilities of the highest order N-grams where the total probability is the product of the individual probabilities for each ith N-gram, where each individual probability is calculated using the recursive interpolation of Equations 1 and 2.

As noted above, the weights are functions of the contexts of the n-gram probabilities they are used to determine. To counteract data sparseness (which would lead to unreliable estimates) and at the same time reduce the computational complexity of the EM training, these weights are grouped into buckets based on the frequency counts of the context. Under one embodiment, ranges of frequency counts are grouped into the same weights. Thus, one $\lambda_{n-1}$ may be for contexts that are seen between 16 and 32 times and one $\lambda_{n-1}$ may be for contexts that are seen between 33 and 64 times. This results in a smaller set of weights that need to be trained and a smaller set of training text that is needed for training.

Note that since the weights are maximized against check data 304, there will be n-grams in check data 304 that were not observed in main data 302. Thus, the weights are set to anticipate unseen data.

Under some embodiments, the training text 300 may be re-segmented in a different manner and the relative frequency counts may be re-determined for the new grouping of text. These new frequency counts may then be applied to the EM trainer 310 to re-determine the values of the weights. When re-determining the values of the weights, the algorithm begins with the estimates of the weights determined at the previous iteration. Such iterations may be repeated until the weights reach stable values. After the desired number of iterations has been formed, a set of weights 312 is stored together with the final set of relative frequency counts 308 as a deleted interpolation model 314 at step 406. This deleted interpolation model may be used to determine probabilities for new text by parsing the text into the different order n-grams, searching for the appropriate weights for each of the contexts and performing the calculation of the interpolated probability using Equations 1 and 2.

The interpolation represented by Equations 1 and 2 is substantially different from the techniques used with the more widely accepted backoff language models, which are typically represented in the standard ARPA format. Instead of using a linear interpolation to determine the probability for an N-gram, the more widely accepted backoff language models use a substitute probability for any N-gram that cannot be located in the model. This substitute probability is based on a lower order model and a backoff weight associated with the context of the probability that can not be located. Thus, instead of performing an interpolation, the more standard backoff language models simply replaces an N-gram probability with a lower order n-gram probability.

Figure 5:
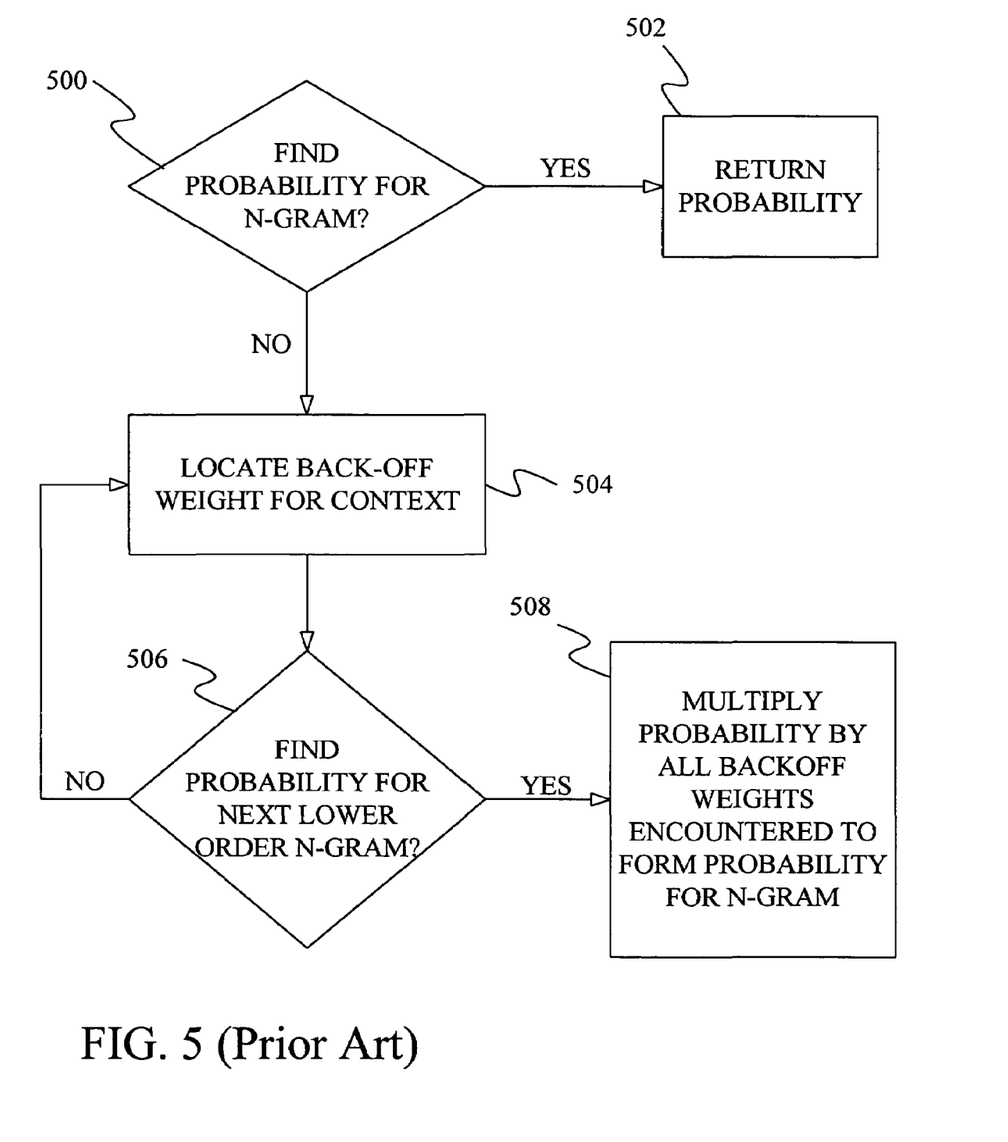
FIG. 5 is a flow diagram for determining a probability using a backoff language model of the prior art.

FIG. 5 provides a flow diagram of a method for determining a probability for an N-gram using a backoff model of the prior art. At step 500 of FIG. 5, a search is performed to determine if a probability for the N-gram is located in the backoff language model. If the probability is present for the N-gram, the probability is returned at step 502. If the probability for the N-gram is not found at step 500, a backoff weight associated with the context of the N-gram is located at step 504. At step 506, a search is performed to determine if the backoff language model includes a probability for the next lower order n-gram. For example, if the top order N-gram was a trigram, step 506 would search for a probability for the bigram. If the probability for the next lower order n-gram can not be found at step 506, the process returns to step 504 to locate the backoff weight for the context of the next lower order n-gram. For example the backoff weight for the context of the bigram. The process then returns to step 506 to search for a probability for the next lower order n-gram. Thus, if a bigram probability had been searched for previously at step 506, a unigram probability would be searched for upon returning to step 506.

Once a probability is found for an n-gram at step 506, the probability is multiplied by all of the backoff weights that were encountered in iterations through steps 504 and 506 to form the probability for the N-gram at step 508.

As can be seen in FIG. 5, in order to calculate a language model probability for an N-gram using the standard backoff language model, the probabilities of various orders of n-grams must be searched for as well as the backoff weights for the contexts of those n-grams. The standard ARPA format for the backoff language models provides a standard format that allows the same search algorithms to be used to find the necessary probabilities and backoff weights regardless of the particular backoff language model that is being used. For example, if two vendors provide two separate backoff language models in the ARPA format, the same code can be used to determine probabilities from both language models.

Figure 6:
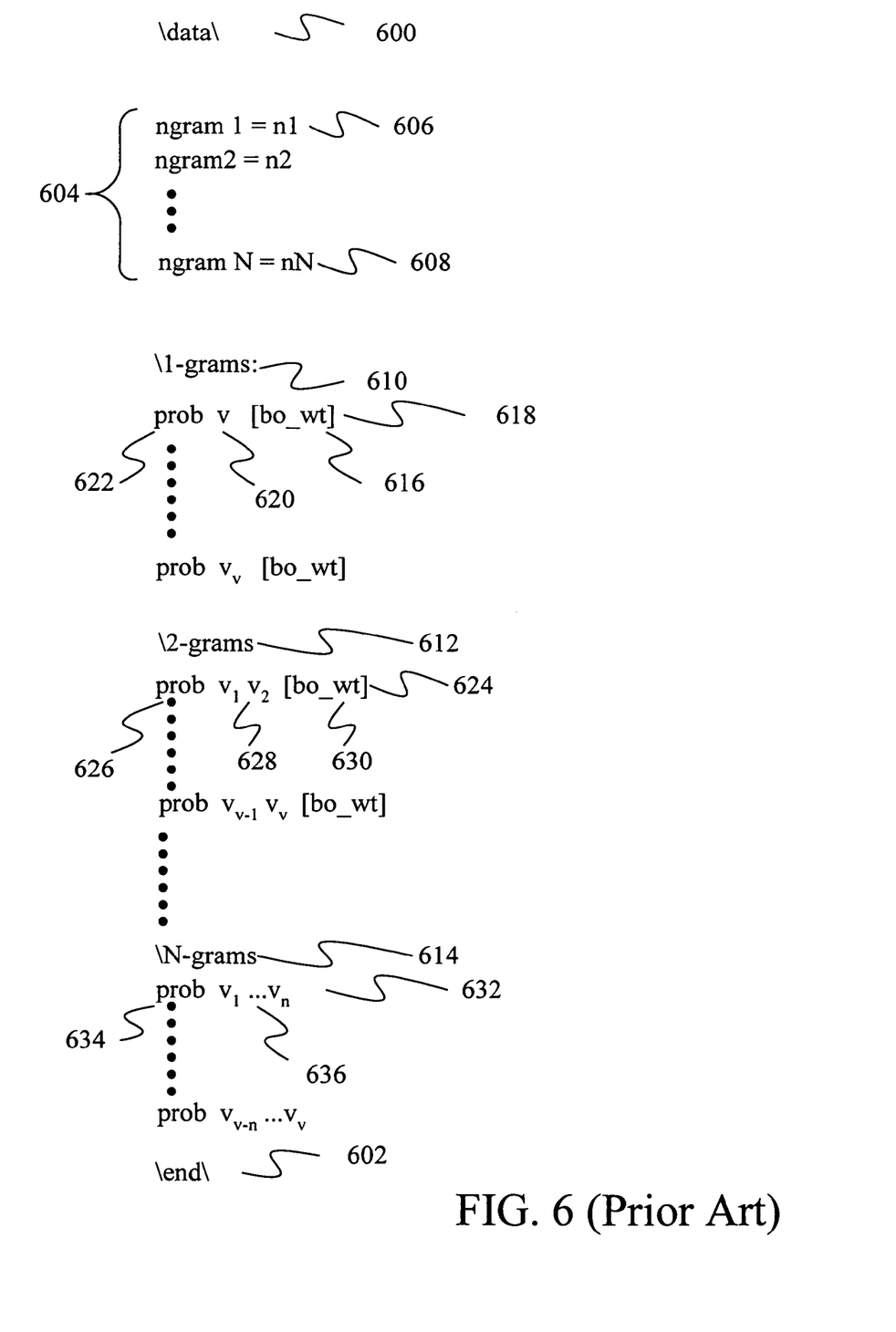
FIG. 6 is a layout for the ARPA standard format for storing backoff language models under the prior art.

FIG. 6 provides a diagram of the layout of the standard ARPA format for backoff language models. In FIG. 6, the standard format includes a header tag 600 and an ending tag 602. Below header tag 600 is a list 604 that includes a separate entry for each order of n-gram. Each entry indicates the number of n-grams for that order of n-grams that is present in the language model. For example, entry 606 indicates that there are n1 unigrams and entry 608 indicates that there are nN N-grams.

Below list 604 are a set of section, with one section for each order of n-gram. Each section is headed with a separate tag such as tag 610 for unigrams, tag 612 for bigrams, and tag 614 for N-grams, where N is the top order of n-grams in the language model.

Below each heading for the different orders of n-grams, there is a list of entries, one for each n-gram of that order. Each entry includes the probability of the n-gram, the n-gram, and for n-grams of orders other than the top order, a backoff weight. For example, under unigram heading 610, entry 618 includes a probability 622 for a unigram 620 and a backoff weight 616. Note that backoff weight 616 is associated with word 620 when word 620 is used as a context in a bigram. Similarly, entry 624 under bigram heading 612 includes a bigram probability 626 for the bigram 628 consisting of words $v_1 v_2$ and a backoff weight 630 associated with words $v_1 v_2$ being used has the context of a trigram. Typically, the probabilities and the backoff weights are stored in log base 10 format.

For entries under top order n-gram heading 614, there are no backoff weights. Thus, for entry 632 there is just a probability 634, and an n-gram $v_1 \ldots v_n$ 636.

Figure 7:
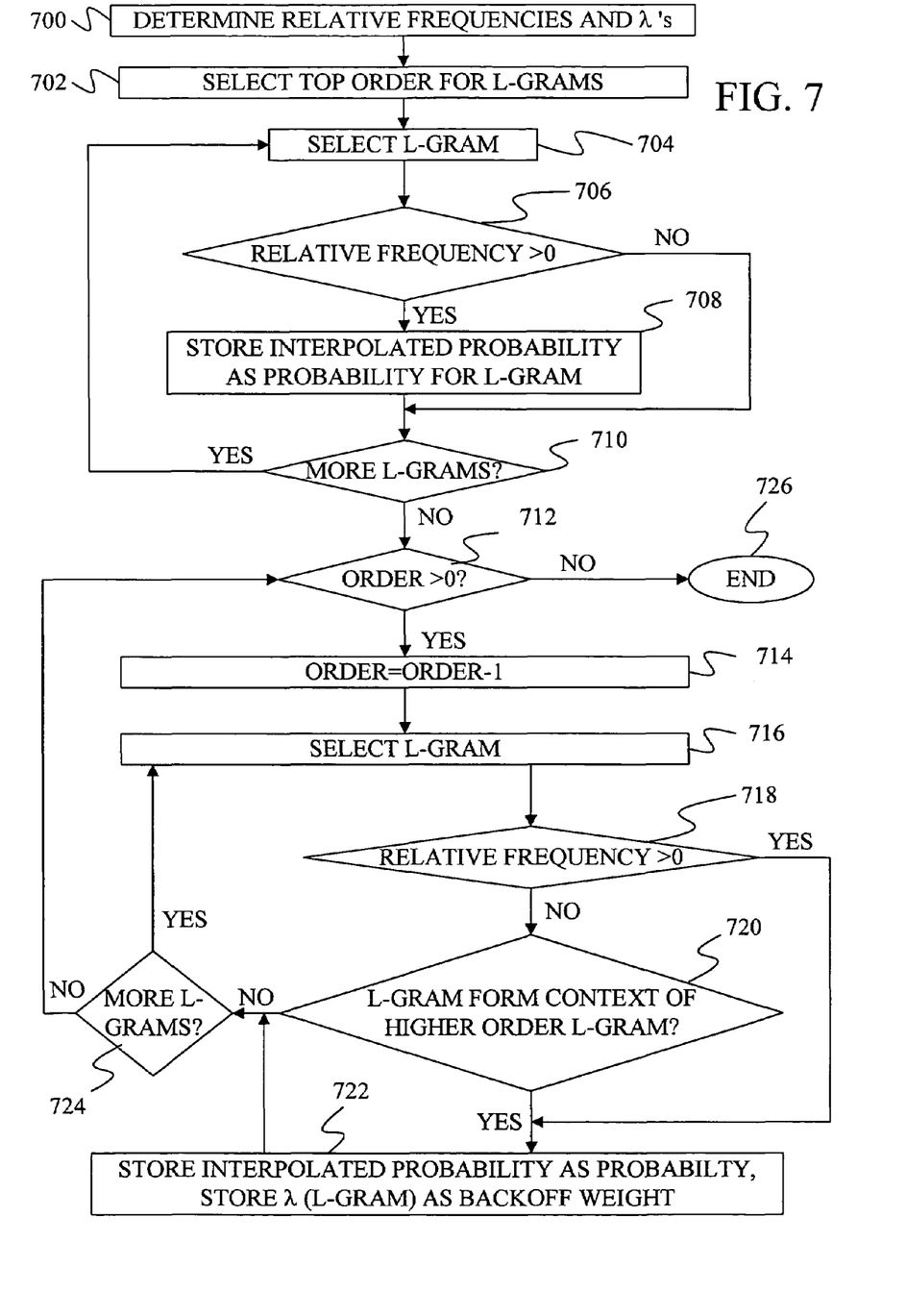
FIG. 7 is a flow diagram for storing a deleted interpolation n-gram language model in the ARPA standard format.

Comparing FIG. 2 with FIG. 6, it is not clear that an interpolation model such as the one shown in FIG. 2 can be stored in the standard ARPA format of FIG. 6. FIG. 7 provides a flow diagram of a method for storing a deleted interpolation model in the standard ARPA format under one embodiment of the present invention.

In step 700 of FIG. 7, the relative frequencies and the weights, $\lambda$, of the deleted interpolation model are determined. The top order for a set of L-grams is selected at step 702, where L is between 1 and N with N being the top order. At step 704, an L-gram of the selected order is selected and at step 706 a determination is made as to whether the relative frequency of the selected L-gram is greater than zero. If it is greater than zero, the interpolation probability for the L-gram is calculated using equation 1 and is stored as the probability of the L-gram in the standard format. For example, an entry under top order heading 614 of FIG. 6 would be created with the probability, such as probability 634, being set equal to the interpolated probability of the L-gram and the L-gram itself being placed in the L-gram field such as field 636 of FIG. 6.

If the relative frequency of the L-gram is not greater than zero, the probability for the L-gram is not stored in the standard ARPA format.

After the probability for the L-gram has been stored at step 708 or after it has been determined that the relative frequency of the L-gram is not greater than zero, the method determines if there are more L-grams to consider for the top order of L-grams at step 710. If there are more L-grams to consider, the processes returns to step 704 and selects the next L-gram. Steps 706 and 708 are then repeated for this new L-gram. Steps 704, 706, 708, and 710 are repeated until all the L-grams of the top order have been processed.

Once all of the L-grams for the top order of L-grams have been processed at step 710, the method determines if the current order of L-grams being processed is greater than zero at step 712. If the order of L-grams currently being processed is greater than zero, the order is reduced by one to move to the next lower order at step 714. An L-gram at this next lower order is then selected at step 716.

At step 718, the relative frequency of the selected L-gram is examined to determine if it is greater than zero. If it is not greater than zero, the process continues at step 720 where the higher order L-grams previously stored in the ARPA file are examined to determine if the present L-gram is a context of one of the higher order L-grams. If the L-gram is found as a context in a higher order L-gram at step 720 or the relative frequency of the L-gram is greater than zero at step 718, the interpolated probability of the L-gram is stored as the probability of the L-gram in the ARPA file and the $\lambda$ that is a function of the L-gram in the deleted interpolation model is stored as the backoff weight for the L-gram at step 722. For example, if the $\lambda$'s are functions of the relative frequencies of the L-grams, the $\lambda$ associated with the relative frequency of the current L-gram is stored as the backoff weight. For example, if the L-gram is the bigram $v_1 v_2$, the weight associated with bigrams that have a relative frequency equal to the relative frequency of $v_1 v_2$ is used as the backoff weight for the bigram $v_1 v_2$ and the interpolated probability is used as the probability of the bigram $v_1 v_2$.

Thus, an L-gram is stored if its relative frequency is greater than zero, i.e. it was seen in the training data, and if it appears as a context for a higher order L-gram. By limiting the L-grams that are stored to those that meet these criteria, this embodiment of the present invention creates a compact language model in the backoff format.

An L-gram can appear as a context while having a relative frequency of zero in the training text if the relative frequencies are determined by setting the relative frequencies to zero if their initial relative frequency is below a threshold. For example, if an L-gram has a relative frequency of 0.02 and the threshold is set to 0.02, the relative frequency for the L-gram would be set to zero. This is done to reduce the size of the interpolation model.

The reason for storing an L-gram if it appears as a context in a higher order L-gram even though it has a relative frequency of zero is that since the L-gram appears as a context for a higher order L-gram, a backoff weight for this context will be needed in the language model.

After step 722 or if the current selected L-gram does not have a relative frequency greater than zero at step 718 and is not used as a context of a higher order L-gram at step 720, the process determines if there are more L-grams of the current order at step 724. If there are more L-grams at the current order, the next L-gram is selected at step 716 and steps 718, 720, 722, and 724 are repeated. Steps 716, 718, 720, 722 and 724 are repeated until all of the L-grams of the selected order have been processed.

When there are no more L-grams for the current order at step 724, the process returns to step 712 to determine if the order is greater than zero. If the order is greater than zero, the next lower order is selected at step 714 and steps 716-724 are repeated for the L-grams in the new lower order. When the order is no longer greater than zero at step 712, all of the orders of n-grams have been processed and the method of FIG. 7 ends at step 726.

Thus, the method of FIG. 7 is able to represent a deleted interpolation n-gram model in the ARPA backoff standard format. This allows language models that are formed through the deleted interpolation technique to be integrated into language systems that expect to receive the standard ARPA format.

Although the present invention has been described with reference to particular embodiments, workers skilled in the art will recognize that changes may be made in form and detail without departing from the spirit and scope of the invention.

What is claimed is:

1. A method of storing parameters of a deleted interpolation language model, the method comprising:
   obtaining a set of parameters for the deleted interpolation language model, wherein the parameters of the deleted interpolation language model allow an N-gram probability to be determined as a linear interpolation of a relative frequency estimate for the N-gram and a probability for a lower order n-gram; and
   storing at least one parameter for the deleted interpolation language model as a parameter for a backoff language model, wherein the backoff language model replaces an N-gram probability with a lower order n-gram and a backoff weight for any N-gram that cannot be located in the backoff language model.

2. The method of claim 1 wherein storing at least one parameter for a deleted interpolation language model comprises storing a relative frequency of a sequence of words as a probability for a sequence of words in the backoff language model.

3. The method of claim 2 wherein storing an interpolated probability comprises determining that a relative frequency for the sequence of words is greater than a threshold before storing the interpolated probability as a probability.

4. The method of claim 3 wherein storing a relative frequency comprises determining that the relative frequency is greater than a threshold before storing the relative frequency as a probability.

5. The method of claim 2 wherein storing an interpolated probability comprises determining that the sequence of words forms a context for an n-gram in the backoff language model before storing the interpolated probability as a probability.

6. The method of claim 1 wherein storing at least one parameter for a deleted interpolation language model comprises storing an interpolation weight for the deleted interpolation model as a backoff weight for the backoff language model.

7. The method of claim 6 wherein storing the interpolation weight further comprises storing a sequence of words associated with the interpolation weight in a same entry as the interpolation weight.

8. The method of claim 1 wherein obtaining a set of parameters comprises training a set of interpolation weights.

9. The method of claim 8 wherein training a set of interpolation weights comprises training a separate weight for each of a set of frequency count ranges.

10. The method of claim 1 wherein storing at least one parameter for the deleted interpolation language model comprises storing the at least one parameter to produce a data structure that conforms to the ARPA format for backoff language models.

11. A computer-readable storage medium having encoded thereon computer-executable instructions for performing steps comprising:
    identifying a parameter for a deleted interpolation language model that forms probabilities through interpolations of values; and
    placing the parameter in a data structure as a backoff parameter for a backoff language model that substitutes a weighted lower order n-gram probability for an N-gram probability when the N-gram cannot be located in the backoff language model.

12. The computer-readable storage medium of claim 11 wherein placing the parameter in a data structure comprises determining that the parameter should be included as part of the backoff language model.

13. The computer-readable storage medium of claim 12 wherein determining that the parameter should be included as part of the backoff language model comprises determining that a frequency of a sequence of words in a training text exceeds a threshold.

14. The computer-readable storage medium of claim 12 wherein determining that the parameter should be included as part of the backoff language model comprises determining that a sequence of words associated with the parameter forms a context in an n-gram stored in the data structure.

15. The computer-readable storage medium of claim 11 wherein placing a parameter in a data structure comprises placing a relative frequency as a probability for an n-gram.

16. The computer-readable storage medium of claim 11 wherein placing a parameter in a data structure comprises placing an interpolation weight as a backoff weight for a context.

17. The computer-readable storage medium of claim 11 wherein the data structure conforms to the ARPA standard for backoff language models.

18. A method for constructing a language model, the method comprising:
   using deleted interpolation to train parameters for a language model;
   storing at least some of the trained parameters in a data structure conforming to the ARPA format for backoff language models.

19. The method of claim 18 wherein storing at least some of the trained parameters comprises storing parameters that are associated with sequences of words that appear in a training text more than a threshold amount.

20. The method of claim 18 wherein storing at least some of the trained parameters comprises storing parameters that arc associated with sequences of words that appear as context words in an n-gram stored in the data structure.

* * * * *